US012688688B2

(12) United States Patent (10) Patent No.: US 12,688,688 B2
Narukiyo et al. (45) Date of Patent: Jul. 21, 2026

(54) IMAGE PROCESSING APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventors: Yuta Narukiyo, Tokyo (JP); Takahiro Kuroyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 578 days.

(21) Appl. No.: 18/159,141

(22) Filed: Jan. 25, 2023

(65) Prior Publication Data

US 2023/0245442 A1    Aug. 3, 2023

(30) Foreign Application Priority Data

Feb. 1, 2022    (JP) .................................. 2022-014199

(51) Int. Cl.
G06V 10/98        (2022.01)
G06T 3/40        (2006.01)
(Continued)

(52) U.S. Cl.
CPC .............. G06V 10/993 (2022.01); G06T 3/40 (2013.01); G06T 7/73 (2017.01); G06V 10/764 (2022.01)

(58) Field of Classification Search
CPC .............. G06V 10/993; G06V 10/764; G06V 2201/031; G06T 3/40; G06T 7/73;
(Continued)

(56) References Cited

U.S. PATENT DOCUMENTS

2020/0097740 A1 *    3/2020    Hashimoto .............. G06T 7/70
2022/0230346 A1      7/2022    Otomaru et al.
(Continued)

FOREIGN PATENT DOCUMENTS

EP        4002270 A1 *    5/2022 .......... G06F 18/241
JP      2012-090747 A      5/2012
(Continued)

OTHER PUBLICATIONS

Yang, L. et al., "Resolution Adaptive Networks for Efficient Inference" IEEE: CVPR (Jun. 2020) pp. 2366-2375.
(Continued)

*Primary Examiner* — Shefali D Goradia
(74) *Attorney, Agent, or Firm* — Carter, DeLuca & Farrell LLP

(57)        ABSTRACT

An image processing apparatus configured to perform recognition processing for a target object in an input image, includes at least one memory storing a program, and at least one processor. The processor, by executing the program, causes the image processing apparatus to perform the recognition processing for the target object in a first image having a first resolution acquired based on the input image and acquire a first recognition result, determine whether or not a reliability of the first recognition result satisfies a predetermined standard, and perform the recognition processing for the target object in a second image which has a higher resolution than the first resolution acquired based on the input image, and acquire a second recognition result, in a case where it is determined that the reliability of the first recognition result does not satisfy the predetermined standard.

19 Claims, 9 Drawing Sheets

(51) Int. Cl.
   *G06T 7/73* (2017.01)
   *G06V 10/764* (2022.01)
(58) Field of Classification Search
   CPC . G06T 2207/10132; G06T 2207/20081; G06T
          2207/20084; G06T 2207/30048; G06T
                          7/0012; G06T 3/4053
   See application file for complete search history.

(56) References Cited

U.S. PATENT DOCUMENTS

| | | | | |
|---|---|---|---|---|
| 2022/0270351 A1* | 8/2022 | Sugahara | ............. | G06V 10/776 |
| 2022/0366537 A1 | 11/2022 | Narukiyo et al. | | |
| 2023/0326190 A1* | 10/2023 | Tajimi | ................. | G06V 10/776 |

FOREIGN PATENT DOCUMENTS

| | | |
|---|---|---|
| JP | 2017-151679 A | 8/2017 |
| JP | 2018-109906 A | 7/2018 |
| JP | 2020-022550 A | 2/2020 |
| JP | 2020-052647 A | 4/2020 |
| JP | 2020-201558 A | 12/2020 |
| JP | 2021-137116 A | 9/2021 |
| WO | 2020/026349 A1 | 2/2020 |
| WO | WO-2021014809 A1 * | 1/2021 ............ G06N 3/045 |
| WO | 2021/200330 A1 | 10/2021 |

OTHER PUBLICATIONS

Notice of Reasons for Refusal issued by the Japanese Patent Office on Oct. 21, 2025 in corresponding JP Patent Application No. 2022-014199, with English translation.
Cootes, T.F. et al., "Active Shape Models—'smart snakes" Proceedings of the British Machine Conference (Sep. 1992) pp. 266-275
Deura, Y. et al., "A Study on Preprocessing for Organ Region Segmentation—Application of Supervoxel and of Saliency Detection" IEICE Technical Report (Sep. 2014) pp. 7-11, vol. 114, No. 200.
Matsuyama, T. et al., "Pattern Classification Based on the Dempster-Shafer Probability Model- Belief Formation from Observation and Belief Integration Using Virtual Belief Space" Institute of Electronics, Information and Communication Engineers (Apr. 1993) pp. 843-853, vol. J76-D-II, No. 4.
Notice of Reasons for Refusal issued by the Japanese Patent Office on Jan. 6, 2026 in corresponding JP Patent Application No. 2022-014199, with English translation.

* cited by examiner

EXAMPLE WHEN LANDMARKS ARE
APPROPRIATE

ENLARGED VIEW WHEN LANDMARKS ARE
AT APPROPRIATE POSITIONS

EXAMPLE WHEN LANDMARKS ARE
INAPPROPRIATE

EXAMPLE WHEN REGION IMAGE IS
APPROPRIATE

EXAMPLE WHEN REGION IMAGE IS SMALL

EXAMPLE WHEN REGION IS OVER-
EXTRACTED

IMAGE PROCESSING APPARATUS, IMAGE PROCESSING METHOD, AND NON-TRANSITORY COMPUTER READABLE MEDIUM

BACKGROUND OF THE INVENTION

Field of the Invention

A technique disclosed here relates to an image processing apparatus, an image processing method, and a non-transitory computer readable medium.

Description of the Related Art

A problem of an image recognition processing based on machine learning, such as deep learning, is that it takes a long processing time when an input image having high resolution (a high number of pixels) is processed.

To solve this problem, Japanese Patent Application Publication No. 2020-201558 and Japanese Patent Application Publication No. 2012-090747 proposed to generate a low resolution image by decreasing the resolution of an input image (that is, by increasing a pixel size to decrease a number of pixels), and process the low resolution image so as to reduce the processing time.

However a problem in this case is that recognition accuracy becomes insufficient when the low resolution image is processed.

SUMMARY OF THE INVENTION

With the foregoing in view, it is an object of the present disclosure to provide an image processing apparatus that can implement both the recognition accuracy and the processing speed in the image recognition processing.

According to an aspect of the present disclosure, it is provided an image processing apparatus configured to perform recognition processing for a target object in an input image, including at least one memory storing a program, and at least one processor which, by executing the program, causes the image processing apparatus to perform the recognition processing for the target object in a first image having a first resolution acquired based on the input image and acquire a first recognition result, determine whether or not a reliability of the first recognition result satisfies a predetermined standard, and perform the recognition processing for the target object in a second image which has a higher resolution than the first resolution acquired based on the input image, and acquire a second recognition result, in a case where it is determined that the reliability of the first recognition result does not satisfy the predetermined standard.

In addition, according to an aspect of the present disclosure, it is provided an image processing apparatus configured to perform recognition processing for a target object in an input image, including at least one memory storing a program, and at least one processor which, by executing the program, causes the image processing apparatus to execute: processing to perform the recognition processing for the target object in a first image having a first resolution acquired based on the input image and acquire a first recognition result; and processing to perform the recognition processing for the target object in a second image having a higher resolution than the first resolution acquired based on the input image and acquire a second recognition result, determine whether or not a reliability of the first recognition result satisfies a predetermined standard, and terminate the processing to acquire the second recognition result in a case where it is determined that the reliability of the first recognition result satisfies the predetermined standard.

The present disclosure may be regarded as an image processing method that includes at least a part of the above mentioned processing, a program that causes a computer to execute this method, or a non-transitory computer readable recording medium that stores this program. The present invention may be implemented by combining the above mentioned configurations and processing operations as long as there is no technical inconsistency.

Further features of the present invention will become apparent from the following description of exemplary embodiments with reference to the attached drawings.

DESCRIPTION OF THE EMBODIMENTS

Figure 1:
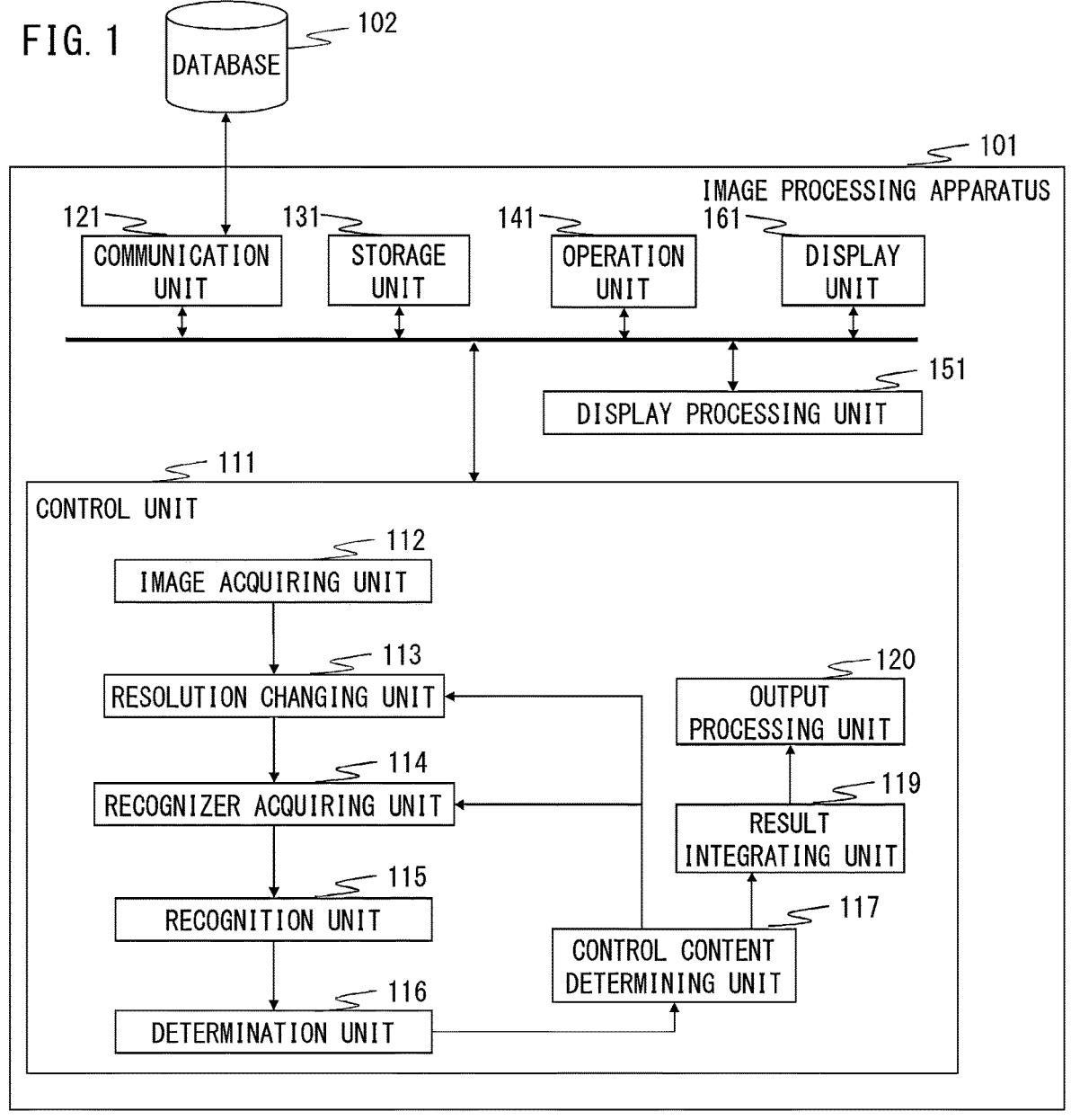
FIG. 1 is a schematic block diagram of an image processing apparatus according to an embodiment.

Preferred embodiments of the technique of the present disclosure will be described with reference to the drawings. Each diagram is merely created for a purpose of describing the structure or configuration, and the dimensions of each member indicated therein do not always reflect actual dimensions. In each diagram, a same member or same composing element is denoted with a same reference sign, and description on redundant content will be omitted.

In the following, a concrete example of an image processing apparatus of an embodiment of the present invention will be described in detail, using a case of performing image processing on a two-dimensional ultrasonic cross-sectional image capturing a heart as an example.

Embodiment 1

An image processing apparatus according to Embodiment 1 executes processing to classify an input image into a predetermined class as the recognition processing. In Embodiment 1, a view classification of the inputted two-dimensional ultrasonic cross-sectional image is performed. As the input image, this apparatus acquires a two-dimensional ultrasonic cross-sectional image which the user (e.g. physician, technician) captured using an ultrasonic probe. Then by analyzing the acquired input image, this apparatus identifies the view class that the input image belongs to. The view class is an example of a predetermined classification type. Specifically, for each of a plurality of view classes (that is, for each class of view class), this apparatus calculates the likelihood (probability) that the input image is classified as the said view class, and outputs the result.

Examples of a view class when a heart is imaged from a body surface are: a four-chamber image of an apical (hereafter four-chamber image), a three-chamber image of an apical (hereafter three-chamber image), a two-chamber image of an apical (hereafter two-chamber image), an image obtained while the ultrasonic probe is left in the air, and the like. The four-chamber image of the apex is an image where four cavities of a left ventricle, left atrium, right ventricle and right atrium are captured. The three-chamber image of the apex is an image where three cavities of a left atrium, left ventricle and right ventricle are captured. The two-chamber image of the apex is an image where two cavities of a left atrium and left ventricle are captured. The image obtained while the ultrasonic probe is left in the air is an image captured in a state where an ultrasonic probe is positioned away from the body surface, and is an image where such an organ as a heart is not captured. Other examples include various long axis images that are captured along the long axis of the left ventricle, and various short axis images that are captured in a state orthogonal to the long axis image.

This apparatus executes the recognition processing after reducing the resolution of the original image (input image) to enable high-speed processing. In this case, however, the information on a part of the image is lost by reducing the resolution, and local information content (feature value) on the apex, the value cusp and the like may drop. In some cases, the identification accuracy (recognition accuracy) of the view class may drop due to the missing information. For example, in some cases, a class of which likelihood exceeds a threshold does not exist, or a likelihood difference between classes of view classes may be less than a threshold. In such a state, this apparatus determines that this output is not a highly accurate solution, and executes the recognition processing again. At this time, identification of the view class is executed using an image, of which resolution is higher than the initial resolution, as the input image, whereby the identification accuracy (recognition accuracy) can be improved using information content (feature value) different from the initial one. Further, normally in machine learning, output results for a same image does not change, but if the image is slightly changed, the output result may be changed. Utilizing this property, statistical processing is performed on recognition results when a low resolution image and a high resolution image are inputted respectively, whereby the recognition accuracy can be improved.

A configuration and processing of an image processing apparatus according to Embodiment 1 will be described with reference to FIG. 1. FIG. 1 is a block diagram depicting a general configuration example of an image processing system that includes the image processing apparatus 101 according to Embodiment 1. As indicated in FIG. 1, the image processing apparatus 101 includes a control unit 111, a communication unit 121, a storage unit 131, an operation unit 141, a display processing unit 151 and a display unit 161. The image processing apparatus 101 is connected to an external database 102 via the communication unit 121.

The control unit 111 is constituted of a central processing unit (CPU) and dedicated or general processors. The control unit 111 may be constituted of a graphic processing unit (GPU) and a field-programmable gate array (FPGA). The control unit 111 may also be constituted of an application specific integrated circuit (ASIC) and the like. The control unit 111 controls each component in the image processing apparatus 101, and executes the processing to be described below, whereby the image processing method according to the technique disclosed in the present invention is implemented.

The image acquiring unit 112 acquires an input image from the database 102 or the storage unit 131. The input image is an image of a target object of a test subject (patient) acquired by an ultrasonic image diagnostic apparatus, for example, and is a two-dimensional cross-sectional image indicating an observation cross section (standard plane) of the test subject when the heart is imaged from the body surface in Embodiment 1, for example. The image acquiring unit 112 may acquire the input image directly from a diagnostic apparatus, and in this case, the image processing apparatus 101 may be installed in the diagnostic apparatus as a function of the diagnostic apparatus. In Embodiment 1, the input image is a two-dimensional image in a one time-phase, but the input image may be a moving image in multiple time-phases, or a single or a plurality of three-dimensional images or three-dimensional moving images. In any of these cases, the effects of the invention are obtained.

A control content determining unit 117 determines whether or not additional recognition processing is performed, based on the output of a later mentioned determination unit 116. The control content determining unit 117 also determines an image to be processed next (processing image). The determination of a processing image here includes determination of a resolution of the processing image (processing resolution). The processing resolution that the control content determining unit 117 determines here is a resolution the same as that of the input image or a resolution lower than that of the input image (low resolution). If the processing image is an image of which resolution is lower than that of the input image, the recognition processing can be executed at high-speed (compared with the case where the input image is used as the processing image).

In the case where the processing resolution determined by the control content determining unit 117 is different from the resolution of the input image (that is, in the case of low resolution), a resolution changing unit 113 converts the resolution of the input image acquired by an image acquiring unit 112 into this processing resolution. In the following, the input image of which resolution has been converted into a low resolution is called a "low resolution image". In other words, the resolution changing unit 113 generates a low resolution image by reducing the resolution of the input image to a predetermined processing resolution.

A recognizer acquiring unit 114 acquires a dictionary or a model constituting a recognizer from the database 102, the storage unit 131 or the operation unit 141.

A recognition unit 115 executes the recognition processing for the processing image (input image or low resolution image generated by the resolution changing unit 113) determined by the control content determining unit 117 using the recognizer acquired by the recognizer acquiring unit 114. The recognition unit 115 according to Embodiment 1 calculates a likelihood that the processing image belongs to a respective view class.

The determination unit 116 determines whether or not the recognition result by the recognition unit 115 satisfies a predetermined standard. In Embodiment 1, a reliability of the recognition result by the recognition unit 115 is calculated, and whether or not the recognition result satisfies the predetermined standard is determined based on this reliability.

A result integrating unit 119 integrates the recognition results of a plurality of processing images by the recognition unit 115, and calculates a final recognition result.

An output processing unit 120 receives the final recognition result from the result integrating unit 119, and outputs the final recognition result to the storage unit 131 and the display processing unit 151.

The communication unit 121 is connectable to an external apparatus or a network, and implements communication using a predetermined means of communication. The communication unit 121 may be constituted of a wireless apparatus (e.g. Wi-Fi and Bluetooth) or a cable apparatus (e.g. a cable-based local area network (LAN) and a universal serial bus (USB)). The communication unit 121 communicates with an external database using a predetermined means of communication, and acquires one or more images and various data, such as learning data.

The storage unit 131 is constituted of at least one medium for recording data (e.g. hard disk drive (HDD), random access memory (RAM)), and is used for saving various data and storing various calculation results. The storage unit 131 may be configured such that a main storage, which is constituted of a volatile memory to temporarily store read data and the like, and an auxiliary storage, which saves data for a long period of time, are separated.

The operation unit 141 is constituted of such input apparatuses as a keyboard, mouse, touch panel and remote controller, and inputs the instructions from the user to various apparatuses.

The display processing unit 151 processes the images and various calculation results received from the control unit 111 in a format that the display unit 161 can display, and transfers the processed results to the display unit 161.

The display unit 161 is constituted of such an output apparatus as a display, and displays display data, such as calculation results and various images processed by the display processing unit 151, for the user.

The database 102 may include images used for the image processing apparatus 101 or may include learning models and the like used for the recognizer acquiring unit 114. The database 102 may also store the results calculated by the image processing apparatus 101, output images and the like. The database 102 may exist on a network or may be physically connected.

Figure 2:
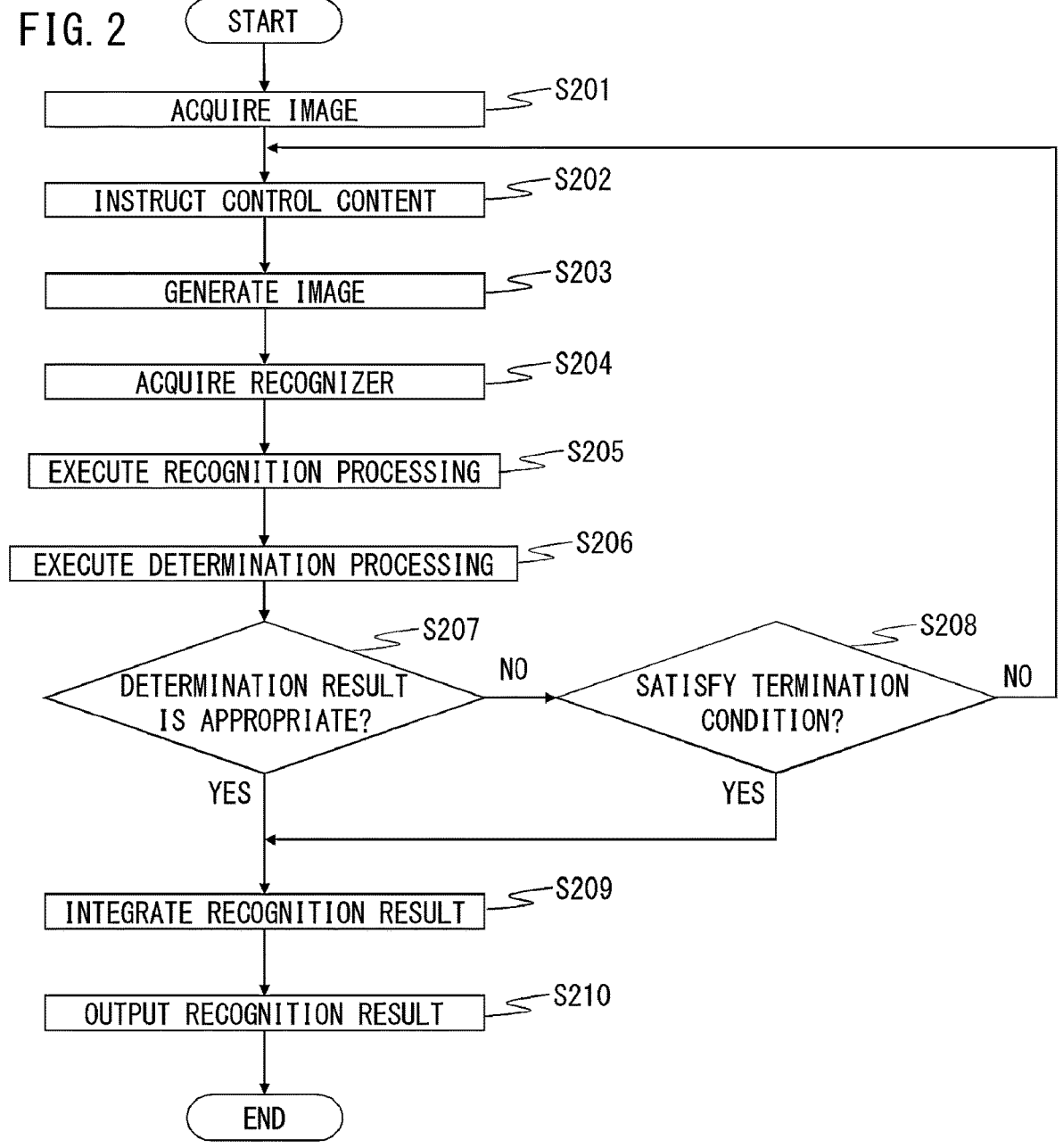
FIG. 2 is a flow chart of processing executed by the image processing apparatus according to an embodiment.

A processing example of the image processing apparatus 101 in FIG. 1 will be described in detail with reference to the flow chart in FIG. 2. In the following description, it is assumed that the input image has been stored in the storage unit 131 of the image processing apparatus 101.

<Step S201: Acquiring Image> In step S201, the image acquiring unit 112 acquires an input image, which the user specified using the operation unit 141, from the storage unit 131. The input image may be acquired using a different method therefrom. For example, an image that satisfies a condition may be read from the database 102, and processed. It is preferable that a size (a number of pixels) of the input image satisfies a condition required for the recognition processing. A size (a number of pixels) of the input image, however, may be a fixed value (e.g. 512×512 pixels) determined in advance. Here the display processing unit 151 may display the acquired input image on the display unit 161.

<Step S202: Instructing Control Content> In step S202, the control content determining unit 117 determines the resolution of the processing image (processing resolution) to be used next. Then the control content determining unit 117 outputs information to indicate the determined processing resolution to the resolution changing unit 113.

Here the control content determining unit 117 sets the processing resolution so that the processing resolution of the later recognition processing becomes higher than the processing resolution of a preceding recognition processing in the plurality of times of the recognition processing. The processing image generated at the processing resolution used in the preceding recognition processing is an example of the first image having a first resolution, and the processing image generated at the processing resolution used in the later recognition processing is an example of the second image having a second resolution. In this case, the processing resolution is determined by determining an image size (a number of pixels) of the processing images, for example. Examples of the image size (a number of pixels) that can be used here are "64×64", "96×96", "128×128", and the like. A number of pixels of each axis need not be the same as that of the other axes. The processing resolution may be determined by determining the pixel size of the processing image. Examples of the pixel size that can be used here are "2 mm×2 mm", "1 mm×1 mm", "0.5 mm×0.5 mm", and the like. The length of each side of the pixel need not be the same. As an alternative, the processing resolution may be determined by a reduction ratio that indicates "a percentage by which an input image is reduced". Examples of the reduction ratio that can be used here are "20%", "25%", "50%", "100%" (no reduction), and the like. The reduction ratio of each axis need not be the same as that of the other axes. The ratio of the image size and the reduction ratio mentioned above are examples of the coefficient for the resolution changing unit 113 to reduce the input image and generate the low resolution image. The coefficient used for this processing image generated for the preceding recognition processing is an example of the first coefficient, and the coefficient used for the processing image generated for the later recognition processing is an example of the second coefficient.

For the processing resolution here, a predetermined fixed value may be used. For example, a fixed image size (a number of pixels) may be determined in advance for each number of times of processing this step. For example, the fixed image size can be set at "64×64" for the first time, "128×128" for the second time, "256×256" for the third time, and the image size (the number of pixels) of the input image for the fourth time. In the same manner, a fixed pixel size may be determined in advance for each number of times of processing this step. For example, the fixed pixel size can be set as "2 mm×2 mm" for the first time, "1.5 mm×1.5 mm" for the second time, and "1 mm×1 mm" for the third time. Further, in the same manner, a fixed reduction ratio may be determined in advance for each number of times of processing this step. For example, the fixed reduction ratio can be set as "25%" for the first time, "50%" for the second time, and "100%" for the third time.

The processing resolution may be variable instead of a fixed value. For example, the processing resolution may be determined in accordance with the image size of the input image. For example, a minimum resolution may be set in advance, and a number of steps to reach from the minimum resolution to the resolution of the input image may be determined in accordance with the image size of the input image. For example, in a case where the minimum resolution is "64×64" and the image size of the input image is "256×256", a three-step processing ("64×64" for the first time, "128×128" for the second time, "256×256" for the third time) is performed. In a case where the image size of the input image is "512×512", a four-step processing ("64×64" for the first time, "128×128" for the second time, "256×256" for the third time, and "512×512" for the fourth time) is performed. Thereby processing can be performed at a processing resolution appropriate for the resolution of the input image.

In the case of CNN or the like, it is normally desirable that a number of pixels of one side of the processing pixel is a power of 2. However, the recognition processing can still be executed even if a number of pixels of one side is a value other than a power of 2. CNN, which is an example of the recognizer of Embodiment 1, has a model with a fully connected layer, which is a structure in which an image is shaped to a one-column vector in the beginning or in the middle of the model, and each pixel is connected with each other up to the output unit or half way to the output unit. In this case, the model structure depends on the resolution of the processing image, hence the dictionary or a model to be acquired is also changed as the resolution is changed.

<Step S203: Generating Image> In step S203, the resolution changing unit 113 generates a low resolution image by converting (reducing resolution) the input image acquired by the image acquiring unit 112 into an image having the processing resolution determined in step S202. Then the resolution changing unit 113 outputs the generated low resolution image to the recognition unit 115. At this time, the generated low resolution image may be saved in the storage unit 131. In a case where the processing resolution determined in step S202 is the same as the resolution of the input image, the resolution changing unit 113 outputs the input image to the recognition unit 115 as the processing image, without generating the low resolution image.

<Step S204: Acquiring Recognizer> In step S204, the recognizer acquiring unit 114 acquires a dictionary or a model, which is required for configuring the recognizer, from the storage unit 131. At this time, the recognizer acquiring unit 114 acquires a dictionary or a model matching with a resolution (a number of pixels) of the processing image. In Embodiment 1, the dictionary or model acquired by the recognizer acquiring unit 114 is defined as an NW model and the parameter values (values of each weight value, bias value, filter kernel, and the like) in the CNN, which is a type of neural network. In this case, both the NW model and the parameter values may be read from the storage unit 131, or only the parameter values may be read from the storage unit 131 by the image processing apparatus 101 constructing the NW model during the execution. There may be a plurality of candidates of dictionaries and models matching with the same resolution (a number of pixels), and in this case, the recognition tendency of the recognition unit 115 can be changed by reading a dictionary or a model specified by the user. In the case where the resolution (a number of pixels) of the processing image is fixed, the processing of reading a dictionary or a model corresponding to the input image in accordance with the resolution (a number of pixels) of the processing image is not essential, and a dictionary or a model, in accordance with an image having a predetermined resolution (a number of pixels), may be read in advance.

The recognition method used by the recognizer may be a recognition method other than a neural network. For example, a random forest constituted of a plurality of decision trees may be used. In this case, the recognizer acquiring unit 114 acquires a threshold and node information for the branching of each node in this step S204. Further, a plurality of reorganizers may be used together. For example, a multi-step recognizer may be used, which includes a recognizer provided for the preceding step to recognize general features, and a recognizer provided for a latter step to recognize detailed features and features that are different from those recognized in the preceding step, based on the output result of the preceding step, so as to execute a coarse to fine strategy method, or the like.

Furthermore, the recognition method used in the recognizer may be a method using template images. In this case, in this step S204, the recognizer acquiring unit 114 acquires such information as template images and a histogram distribution based on prior probability, in addition to a dictionary and a model determined by learning. In the case of using the template images, the likelihood that the processing image is a four-chamber image can be calculated by calculating the matching degree between a template image of a four-chamber image and a processing image, using a deviation amount and correlation function, for example. In the case of using the prior probability, the likelihood can be calculated based on the matching degree between the processing image and the prior probability.

<Step S205: Executing Recognition Processing> In step S205, the recognition unit 115 executes the recognition processing for the processing image (the low resolution image generated by the resolution changing unit 113 or the input image). In Embodiment 1, the likelihood of each view class is outputted. Here the value range of the values to be outputted is 0 to 1, but may be normalized to a different value range. In Embodiment 1, the total of the likelihood of various view classes is not always 1, and the view class having the highest likelihood is outputted. However, the total of the likelihood of each class may be normalized to be 1 using a Softmax function, which is one of the activation functions, for the output layer of the CNN, for example. The recognition unit 115 saves the recognition result of this step S205 in the storage unit 131. The recognition result of the processing image generated at the processing resolution in the recognition processing executed first is an example of the first recognition result, and the recognition result of the processing image generated at the processing resolution in the recognition processing executed later is an example of the second recognition result.

<Step S206: Executing Determination Processing> In step S206, the determination unit 116 determines whether or not the recognition result by the recognition unit 115 is appropriate, based on the recognition result. For example, the recognition result is determined as appropriate when the likelihood of the highest class in the recognition result is a predetermined likelihood or more. In other words, the likelihood of the highest class in the recognition result is defined as the reliability of this identification result, and the determination unit 116 determines whether or not the reliability is a predetermined threshold or more using a predetermined standard. If the reliability is the predetermined threshold or more, the determination unit 116 determines that the recognition result is appropriate. For example, in a case where the reliability of the identification result exceeds the threshold of 0.5 (in other words, the likelihood of any class exceeds 0.5), the determination unit 116 determines that this recognition result is appropriate. In the case where the reliability does not satisfy the predetermined standard, that is, in the case where the reliability does not exceed 0.5 (likelihood of no class exceeds 0.5), on the other hand, the determination unit 116 determines that this recognition result is inappropriate (is more likely to be inappropriate).

Figures 3A, 3B:
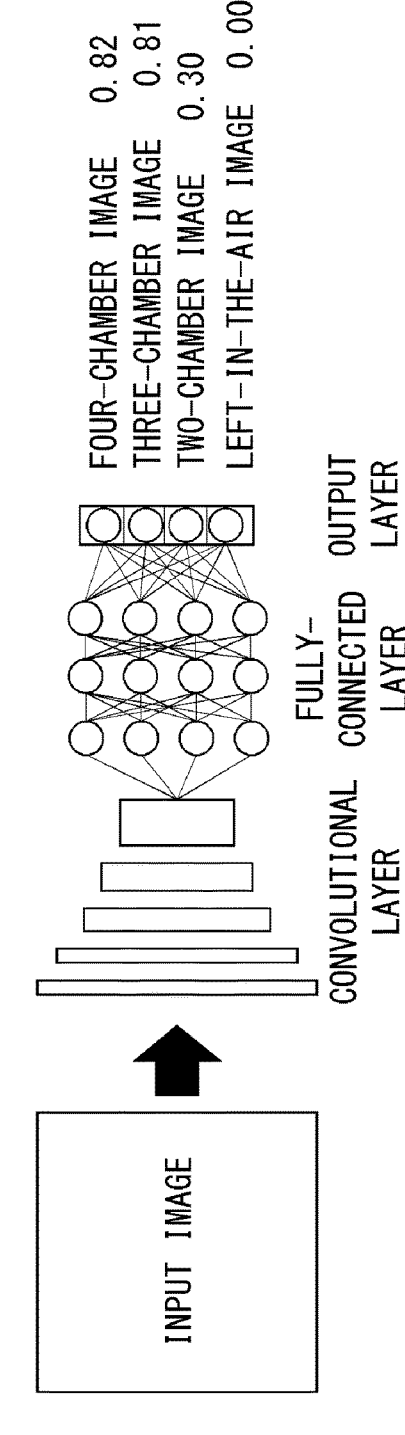
FIGS. 3A and 3B are diagrams depicting an output of a recognition unit according to an embodiment.

Further, in a case where the likelihood difference between the class of which likelihood is highest and the class of which likelihood is second highest is a predetermined likelihood difference or more, the recognition result may be determined as appropriate. In other words, the likelihood difference between the class of which likelihood is highest and the class of which likelihood is second highest in the recognition result is defined as the reliability of this recognition result, and the recognition result of which reliability is the predetermined threshold or more is determined as appropriate. For example, as indicated in FIG. 3A, it is assumed that the probability that an image is a four-chamber image is 0.8, the probability that the image is a two-chamber image is 0.1, the probability that the image is a three-chamber image is 0.01, and the probability that the image is obtained while the ultrasonic probe is left in the air is 0.0. In this case, the likelihood difference between the four-chamber image of which likelihood is highest and the two-chamber image of which likelihood is second highest is 0.7, which is 0.5 or more, hence it is determined that this recognition result is appropriate. If this likelihood difference is less than the predetermined value, on the other hand, it is determined that this recognition result is inappropriate (possibly inappropriate). For example, in the case where a probability that an image is a four-chamber image is 0.82 and a probability that the image is a three-chamber image is 0.81, as indicated in FIG. 3B, the likelihood difference is 0.01, that is, less than 0.5, hence it is determined that this recognition result is inappropriate.

The reliability is not limited to a scalar value, as mentioned above, and the determination is not limited to the simple comparison between the reliability and the threshold. For example, the determination may be performed using a combination of a plurality of reliabilities mentioned above. For example, it may be determined that the recognition result is appropriate when at least one of the plurality of reliabilities exceeds a threshold. As an alternative, it may be determined that the recognition result is appropriate only when all the plurality of reliabilities exceed the threshold.

<Step S207: Determining Based on Determination Result> In step S207, the control content determining unit 117 terminates the flow of the recognition processing if the determination unit 116 determined that the recognition result is "appropriate", and advances the processing to step S209. The control content determining unit 117 advances the processing to step S208 if determined "inappropriate".

<Step S208: Determining Based on End Condition> In step S208, the control content determining unit 117 terminates the flow of the recognition processing if a predetermined termination condition is satisfied. For example, in the case where a predetermined number of times of recognition processing are executed, or where an image exceeding the resolution of the current processing image cannot be provided, the control content determining unit 117 terminates the flow of the recognition processing, and advances the processing to step S209. If the predetermined termination condition is not satisfied, on the other hand, the control content determining unit 117 determines that additional recognition processing is necessary, and returns the processing back to step S203, and executes the recognition processing at a new resolution.

<Step S209: Integrating Recognition Result> In step S209, the result integrating unit 119 generates a final recognition result based on the recognition results acquired by a plurality of times of recognition processing. If a number of times of executing the recognition processing here is 1, this recognition result is regarded as the final recognition result. If a number of times of executing the recognition processing is 2 or more, the final recognition result is generated from the plurality of recognition results. This final recognition result is an example of the third recognition result acquired based on at least one of the first recognition result and the second recognition result. For example, the result of the recognition processing executed last is regarded as a final recognition result. As an alternative, the result of recognition processing, of which reliability is highest among the reliabilities of the plurality of recognition results, is regarded as the final recognition result. Further, the likelihood of each recognition result may be weight-averaged, so as to output the average value. The weights used here may be determined based on the resolution of the image (so that the recognition result of an image having a higher resolution has more value). Further, the final likelihood of each class may be determined based on the average value of unweighted likelihood values. Furthermore, processing to acquire the third recognition result may be performed by integrating the first recognition result and the second recognition result based on the reliability of the first recognition result and the reliability of the second recognition result. An example of the integration processing of the recognition results here is processing by the majority decision based on inference using ensemble learning, but the integration processing may be processing by the majority decision based on a method other than the inference using the ensemble learning. The likelihood of each class may be outputted without determining an average thereof, or may be outputted in a descending order from the highest likelihood, or outputted in a descending order from the highest resolution.

<Step S210: Outputting Recognition Result> In step S210, the output processing unit 120 outputs the final recognition result acquired in step S209. For example, the result may be saved in the storage unit 131 or the database 102, or may be displayed on the display. Further, the likelihood of each view class may be directly outputted, or the view class of which likelihood is the highest may be outputted.

In Embodiment 1, the reliability of a recognition result at a certain processing resolution is determined by the image processing apparatus 101 executing the above processing steps. If it is determined that the reliability is inappropriate, the recognition result using an imaging having higher processing resolution is also used, whereby the recognition accuracy is improved. The control unit 111 does not always repeat the above recognition processing steps a plurality of times, but if the result of the first recognition processing (for a low resolution image) is determined as appropriate, this result is used and is outputted from the output processing unit 120 (output unit). In this case, the subsequent recognition processing (for a high resolution image) is not executed, hence the processing load can be reduced while maintaining the recognition accuracy (both the accuracy and processing speed can be implemented).

Modification 1-1

In Embodiment 1, every time the resolution (a number of pixels) of a processing image is changed in the image processing apparatus 101, a matching dictionary or model is acquired again. In the case of a model that does not include the above mentioned fully connected layer in the neural network, however, the model does not depend on the processing resolution. Therefore the same model can be used to receive a processing image having a different resolution (a number of pixels). Further, even if a model includes a fully connected layer, the model does not depend on the resolution if such an image processing as global average pooling (GAP) is added, instead of shaping the processing image into a one-column vector and inputting this to the fully connected layer. Therefore a same model can be used to receive a processing image having a different resolution (a number of pixels).

In this case, in step S204, the recognizer acquiring unit 114 need not always execute the processing to change the dictionary or model in accordance with the resolution (a number of pixels) of the processing image.

Modification 1-2

In Embodiment 1, the determination unit 116 automatically determines whether or not the recognition result by the recognition unit 115 is appropriate, but it may be configured such that the user specifies whether or not the recognition result is appropriate.

In this case, in step S206, the control unit 111 displays the recognition result by the recognition unit 115 on the screen or the like to notify the recognition result to the user. Then the determination unit 116 acquires, via UI (not illustrated), the instruction from the user on whether the recognition result is "appropriate" or "inappropriate". At this time, in addition to the output of the image, the likelihood and the class value, noteworthy information, which the CNN used for determination, may also be outputted, or such a model or actual example image as the four-chamber image may be displayed on the screen to assist the user to perform determination.

Further, after executing the recognition processing for a plurality of times, the control unit 111 may display a plurality of recognition results and acquire, via UI (not illustrated), an instruction form the user on which recognition result to be selected, which method to be used for integrating the recognition result, or the like. Thereby, based on the instructions that the control unit 111 acquired, the processing in step S209 may be executed.

Modification 1-3

In Embodiment 1, processing targets of the recognition processing are the input image and the low resolution image generated by converting the resolution of the input image. The processing images that are used, however, are not limited to the input image and the low resolution image thereof. For example, the processing targets may be a partial image extracted from the input image, and a low resolution image of this partial image. For the extraction range of the partial image here, image recognition processing, to recognize the existing range of a target area (e.g. target organ), may be performed on the input image, and a region, including the organ recognized thereby, may be extracted as the partial image. The user may specify the extraction range. For example, the volume of interest (VOI) specified by the user may be regarded as the extraction range. Further, a predetermined range, centered around the point specified by the user, may be extracted.

For example, in an image processing apparatus where the user specifies an area around the center position of a lesion in the input image, the lesion area is extracted, images having different resolutions are sequentially processed, then both the higher speed processing and higher accuracy can be implemented. In this case, the image processing apparatus extracts the partial image in a predetermined range centered around the point specified by the user, and extracts the lesion area using this partial image (or an image generated by reducing the resolution of the partial image) as a processing image. Since the lesion area should be included in this processing image, the information, on whether or not the lesion area is extracted, can be used as the likelihood of the recognition result. In other words, in a case where the lesion area is not extracted in the recognition processing for the low resolution image, it is determined that the recognition result is inappropriate, and the recognition processing is performed using an image having a higher resolution.

Modification 1-4

In Embodiment 1, if the recognition result of the first processing image is appropriate in step S207, the recognition result is outputted without performing any more recognition processing using a next processing image. However, when the recognition result of the first processing image is appropriate in step S207, the recognition processing may be performed using the next processing image, so that the respective recognition results are integrated. In the following, aspects different from Embodiment 1 will be mainly described, and a composing element or processing step the same as Embodiment 1 is denoted with a same reference sign, and detailed description thereof will be omitted.

Figure 4:
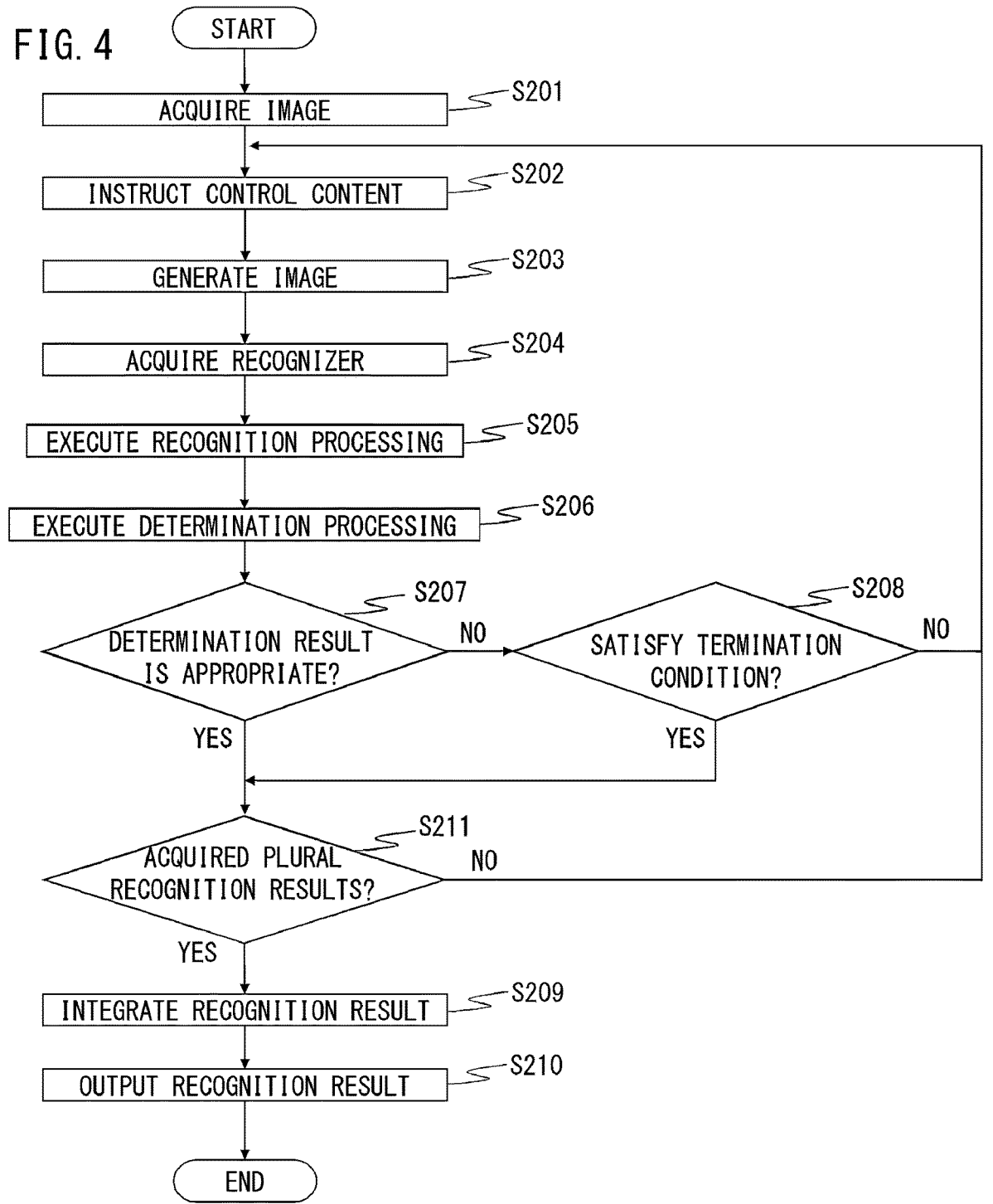
FIG. 4 is a flow chart of processing executed by an image processing apparatus according to a modification.

FIG. 4 indicates a flow chart of the processing executed by the image processing apparatus 101 of Modification 1-4. In Modification 1-4, in the case where the determination unit 116 determined that the recognition result is "appropriate" in step S207, the control content determining unit 117 advances the processing to step S211. Then in step S211, the control content determining unit 117 determines whether or not a plurality of recognition results have been acquired by a plurality of times of recognition processing. If the number of times of execution of the recognition processing is 1, only one recognition result has been acquired, hence the control content determining unit 117 returns the processing from step S211 to step S202. If the number of times of execution of the recognition processing is 2 or more, a plurality of recognition results have been acquired, hence the control content determining unit 117 advances the processing to step S209, where the result integrating unit 119 executes the processing to integrate the recognition results, and generates the final recognition result. Thereby when the determination unit determines that the reliability of the first recognition result satisfies a predetermined standard, the recognition unit performs the recognition processing for a target object in the second image, and acquires the second recognition result. Then the result integrating unit 119 can acquire the recognition result by integrating the first recognition result and the second recognition result.

In the above mentioned embodiment and modifications, one of the two recognition results having a higher reliability is outputted, or the two recognition results are integrated, but it may be configured such that a final recognition result is acquired using two or more recognition results.

Embodiment 2

An image processing apparatus according to Embodiment 2 extracts an anatomical landmark, which indicates a position of a structure or a feature of a test subject, from a medical image, and outputs the coordinate values thereof as the recognition result. At this time, just like Embodiment 1, the recognition processing for a low resolution image is executed. Then the image processing apparatus determines whether or not the recognition result is appropriate, and changes the processing resolution (to a higher resolution), and executes the recognition processing again if inappropriate. A difference from Embodiment 1 here is that it is determined whether or not the recognition result is appropriate is determined by evaluating the detected positions of the landmarks.

The processing flow chart of the image processing apparatus according to Embodiment 2 is basically the same as that of Embodiment 1. Differences are: the recognition unit 115 and the determination unit 116 in the apparatus configuration of the image processing apparatus; the recognition processing in step S205; and the method for determining whether or not the recognition result is appropriate in step S206. In the following, aspects that are different from Embodiment 1 will be mainly described, and a composing element or processing step the same as Embodiment 1 is denoted with a same reference sign, and detailed description thereof will be omitted.

In Embodiment 2, a case of extracting a contour of a left ventricular endocardium in the ultrasonic image will be described as an example of landmark detection. In Embodiment 2, the contour of the endocardium is defined by a predetermined number of landmarks disposed on the contour. In other words, the image processing apparatus according to Embodiment 2 estimates coordinate values of the landmarks on the inputted ultrasonic cross-sectional image. The contour of the left ventricular endocardium can be acquired by interpolating the acquired landmark coordinates.

The ultrasonic diagnostic apparatus images inside the body by capturing a reflected wave of the ultrasonic wave emitted from a probe. At this time, a substance having a low reflectance, such as air, is imaged dark, and liquid, organs, and the like having a high reflectance are imaged bright. In Embodiment 2, it is assumed that the contour of the endocardium exists near the boundary between a low brightness portion and a high brightness portion. The low brightness portion and the high brightness portion in Embodiment 2 are based on relative values on the screen. For example, pixel values exceeding an average value of the pixels in the field-of-view of the image are regarded as the high brightness portion, and the pixel values less than the average value are regarded as the low brightness portion, or a predetermined range based on a histogram may be set as the high brightness portion or the low brightness portion.

Estimation of the contour of the left ventricular (LV) endocardium in the two-chamber image in FIGS. 5A to 5C will be described as an example. In the range of a field-of-view 401 in FIGS. 5A to 5C, black indicates a low brightness portion and white indicates a high brightness portion. The expression of the field-of-view in the ultrasonic image is normally fan-shaped from a probe, but is expressed as a triangle in FIGS. 5A and 5C for simplification.

<Step S205: Executing Recognition Processing> After the image processing apparatus 101 executes the steps S201 to S204 in FIG. 2, the recognition unit 115 executes the recognition processing for the processing image in step S205. In Embodiment 2, a predetermined number of contour points of the left ventricular endocardium are outputted. Here it is preferable that the coordinate values are normalized to values from 0 to 1, but may be normalized in a different range. For example, in the case of output of the coordinate points in CNN, the recognition unit 115 outputs the x and y components of each point in a format of a one column-vector respectively. The recognition unit 115 saves the recognition result in this step in the storage unit 131.

<Step S206: Executing Determination Processing> In step S206, the determination unit 116 determines whether or not the result of the recognition processing performed by the recognition unit 115 is appropriate. In Embodiment 2, it is defined that a number of landmarks existing on the boundary between the high brightness portion and the low brightness portion is the reliability of the recognition result. In other words, the reliability of the recognition processing result is determined as high when a number of landmarks, of which peripheral brightness values satisfy a predetermined relationship, is a predetermined number of more.

Figure 5A:
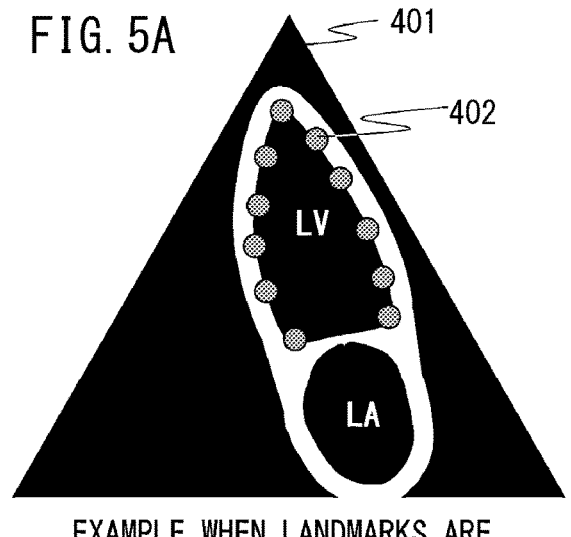
FIGS. 5A to 5C are diagrams depicting a recognition result of a landmark according to an embodiment.
Figure 5B:
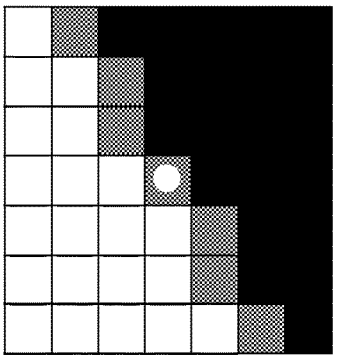

For example, in a case where each landmark 402 exists around the boundary between a relatively high brightness portion and a relatively low brightness portion, as illustrated in FIG. 5A, the high brightness portion and the low brightness portion exist at a certain ratio around the landmarks, hence it is determined that the landmark is at an appropriate position. For example, in a left side endocardium contour landmark, if high brightness portions concentrate on the left side of the landmark, and low brightness portions concentrate on the right side thereof, it can be determined that the landmark is located on the boundary. According to FIG. 5B, which is an enlarged view of the landmark portion in FIG. 5A, the ratio of the high brightness pixels and the low brightness pixels, when N number of pixels around the landmark are observed, is about 1:1, hence it can be determined that this landmark is positioned near the boundary. Here N of the N number of peripheral pixels may be 4 if these are pixels above, below and on the left and right of the pixel of the landmark, or may be 8 including the pixels located at diagonal directions of the pixel of the landmark, for example. The gray portion in FIG. 5B indicates that this portion is on the boundary between the high brightness portion and the low brightness portion. The reliability is determined for each landmark, and if it is determined that at least a predetermined number of landmarks (e.g. respective majority of left and right landmarks) exist near the boundary, the recognition reliability is determined as high.

It can also be determined that the reliability is high in the case where the landmark exists in the high brightness portion. In this case, no low brightness portions exist (or few low brightness portions exist due to noise) around the landmark, and high brightness portions are dominant, hence the reliability is determined as high. In order to reduce the influence of noise and the like, such processing as smoothing may also be performed for the image, as mentioned above.

Figure 5C:
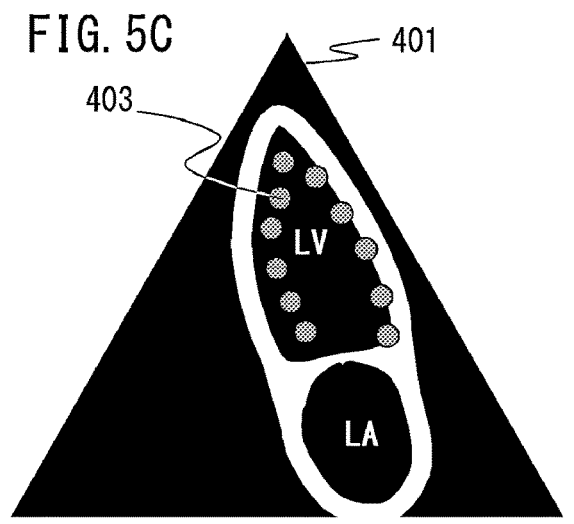

On the other hand, in a case where the landmark 403 exists in the low brightness portion, as illustrated in FIG. 5C, it is determined that the recognition result is not likely to be appropriate. In a case where many pixels around the landmark 403 exist in low brightness portions, it can be determined that the landmark 403 does not exist near the boundary of the high brightness portion and the low brightness portion.

In an ultrasonic image, however, an image that is not clear may be inputted in some cases, depending on the imaging conditions or the like. For example, in a case where the right side of the left ventricle is not included in the image, the high brightness portions may not exist in the image. When no high brightness portions are detected in a search around the landmark, even if the boundary of the field-of-view 401 is reached, this landmark may be excluded from the calculation of the reliability, and the determination processing may be executed using only the reliabilities of the remaining landmarks.

As described above, according to the image processing apparatus of Embodiment 2, it can be determined that the reliability of the recognition processing result is high and the recognition processing result is appropriate, if a number of landmarks existing around the boundary between a low brightness portion and a high brightness portion, or on a high brightness portion, is a predetermined number of more.

Embodiment 3

An image processing apparatus according to Embodiment 3 extracts an anatomical region (anatomical area) of the test subject from a medical image (segmentation), and outputs the region image (mask image) indicating the extracted region as a recognition result. At this time, just like Embodiments 1 and 2, the recognition processing is executed first for a low resolution image. Then it is determined whether or not the recognition result is appropriate, and if the recognition result is inappropriate, the processing resolution is changed (to a higher resolution), and the recognition processing is executed again if the recognition result is not appropriate. A difference from Embodiment 1 here is that the determination step, to determine whether or not the recognition result is appropriate, is performed by evaluating a number of pixels or relative position of the extracted region image.

The processing flow chart of the image processing apparatus according to Embodiment 3 is basically the same for those of Embodiments 1 and 2. Differences are: the recognition unit 115 and the determination unit 116 in the apparatus configuration of the image processing apparatus; the recognition processing in step S205; and the method for determining whether or not the recognition result is appropriate in step S206. In the following, aspects that are different from Embodiments 1 and 2 will be mainly described, and a composing element or processing step the same as Embodiments 1 and 2 is denoted with a same reference sign, and detailed description thereof will be omitted.

Figure 6A:
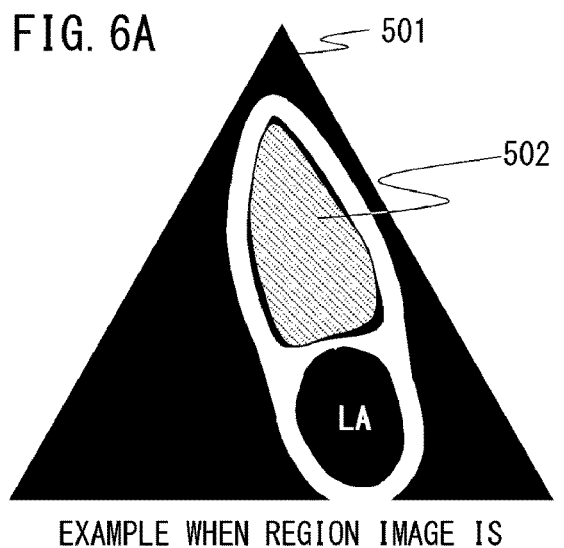
FIGS. 6A to 6C are diagrams depicting a recognition result of an object region according to an embodiment.
Figure 6B:
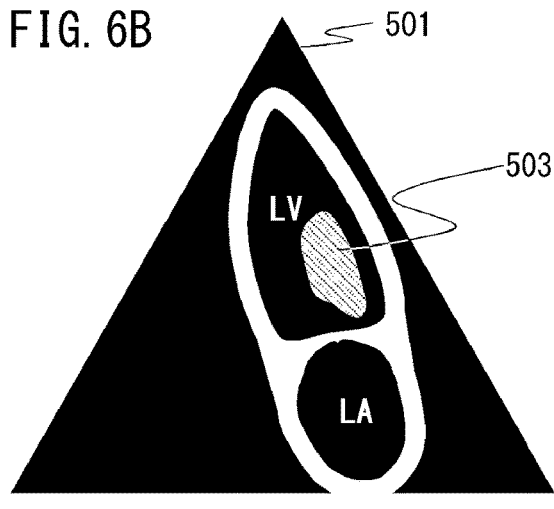
Figure 6C:
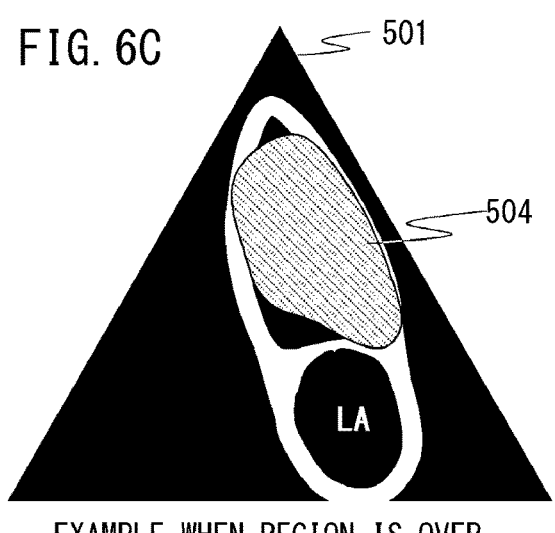

The region extraction processing in Embodiment 3 will be described using an example of extracting a region of the left ventricular-chamber in the two-chamber image, as illustrated in FIGS. 6A to 6C. The size of the left ventricular-chamber is different depending on the test subject, and the user adjusts the imaging range so as to be a predetermined size when the left ventricle is observed, and then captures the image. Therefore it is determined that the recognition result is inappropriate if a region image of which size is a predetermined area or less is outputted.

The processing of Embodiment 3 will be described using the extracted images of the left ventricular-chamber region, illustrated in FIGS. 6A to 6C. In the range of the field-of-view 501 in FIGS. 6A to 6C, black indicates a low brightness portion, and white indicates a high brightness portion. Shaded portions in the region images 502, 503 and 504 in FIGS. 6A to 6C indicate the results of the extracted regions after the recognition processing.

<Step S205: Executing Recognition Processing> After the image processing apparatus 101 executes the processing steps S201 to S204 in FIG. 2, the recognition unit 115 executes the recognition processing for the processing image in step S205. In Embodiment 3, a left ventricular endocardium region unit outputs an image filled with pixels having a predetermined pixel value. For example, an image filled with pixels having pixel value 1 is outputted as the region recognized as a chamber, and an image filled with pixels having pixel value 0 is outputted as the other regions, but the pixel values used here are not limited thereto. The recognition unit 115 saves the recognition result in this step in the storage unit 131.

<Step S206: Executing Determination Processing> In step S206, the determination unit 116 determines whether or not the result of the recognition processing performed by the recognition unit 115 is appropriate. For example, it is determined that the recognition result is appropriate if a number of pixels of the region image in the recognition result is a predetermined reference value (minimum value) or more. In other words, a number of pixels of the region image in the recognition result is defined as the reliability, and the recognition result is determined as appropriate if the reliability is a predetermined threshold or more.

For example, in the case of FIG. 6A, a region image having a number of pixels that fill the surface area of the left ventricular-chamber region is outputted as the region image 502 after the recognition processing, hence it is determined that the region image is appropriate. For the predetermined threshold, a number of pixels of an average region image in the left ventricular image data set, for example, may be used.

In the case where the reliability does not exceed the predetermined reference value (minimum value), on the other hand, it is determined that this recognition result is inappropriate (more likely to be inappropriate). When the CNN used in Embodiment 3 fails in recognition processing of a region image, the cause may be that a large portion of a region image of the left ventricle is missing, or the region image was not outputted at all. For example, in the case where a number of pixels of the region image 503, on which the recognition processing was performed, is less than a predetermined value, as illustrated in FIG. 6B, it can be determined that this recognition result is likely to be inappropriate.

In a case where the high brightness region of the ultrasonic image corresponding to the region image is large in the recognition result as well, it can be determined that the recognition result is inappropriate. In other words, a number of pixels of the low brightness region in the ultrasonic image corresponding to the region image can be defined as the reliability. In the case where the high brightness region, of which number of pixels is a predetermined value or more, exists in the region image 504 recognized by the recognition unit 115, as indicated in FIG. 6C, it can be determined that the recognition result is likely to be inappropriate. In this case, it is likely that the region image extends into the left ventricular endocardium image as mentioned in step S206 of Embodiment 2. Therefore it is determined that the recognized region image is over-extracted.

The reliability is not limited to the above scalar values, and the determination is not limited to a simple comparison between the reliability and the threshold. That is, the determination may be performed by a combination of the above mentioned plurality of reliabilities. For example, it may be determined that the recognition result is appropriate when at least one of the plurality of reliabilities exceed the threshold. Further, it may be determined that the recognition result is appropriate when all of the plurality of reliabilities exceed the threshold.

Embodiment 4

An image processing apparatus according to Embodiment 4 identifies (detects) a target cross section (hereafter called a standard plane or observation cross section) of a test subject in the three-dimensional medical image, and outputs the cross section. Specifically, the image processing apparatus extracts a part of the medical image as a patch, recognizes whether or not the standard plane (observation cross section) of the test subject in the three-dimensional image is included in the patch, and outputs the recognition result. Here a "standard plane is included in the patch"

means that the standard plane is included in the patch at a predetermined position and orientation. For example, it means that a predetermined cross section (e.g. z=0 plane) defined in the patch approximately matches with the standard plane. At this time, just like Embodiments 1 to 3, the recognition processing is executed first for a low resolution image. Then it is determined whether or not the recognition result is appropriate, and the processing resolution is changed (to a higher resolution) and the recognition processing is executed again if the recognition result is inappropriate. A difference from Embodiment 1 here is that the determination step, whether or not the recognition result is appropriate, is performed using a number of patch-extracted images having high likelihood.

In Embodiment 4, a patch extracting unit 612, which is an image extracting unit, is additionally included in the image processing apparatus, and the recognition unit and determination unit are different from the recognition unit 115 and the determination unit 116 of Embodiments 1 to 3. Furthermore, the recognition processing in step S205 executed by the image processing apparatus, and the method for determining whether or not the recognition result is appropriate in step S206, are different. In the following, aspects that are different from Embodiments 1 to 3 will be mainly described, and a composing element or processing step the same as Embodiments 1 to 3 is denoted with a same reference sign, and detailed description thereof will be omitted.

Figure 7:
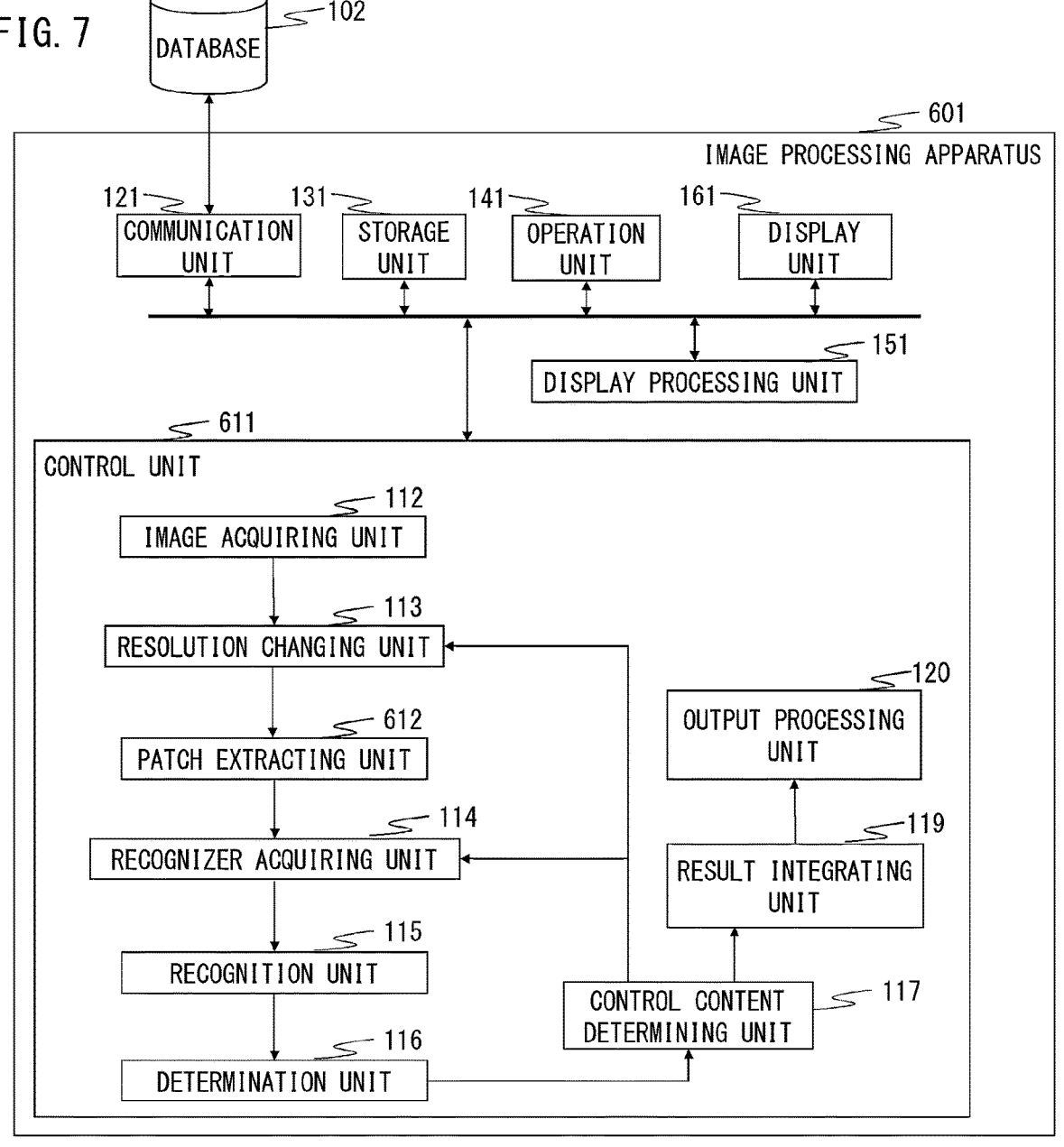
FIG. 7 is a block diagram of an apparatus according to Embodiment 4.

FIG. 7 is a block diagram depicting a general configuration example of the image processing apparatus 601 according to Embodiment 4. As indicated in FIG. 7, a control unit 611 of the image processing apparatus 601 includes a patch extracting unit 612 that extracts a patch for a processing image, in addition to the configuration of the control unit 111 of the image processing apparatus 101.

In Embodiment 4, the recognition processing to identify the standard plane in the three-dimensional image will be described as an example. The recognition processing to identify the standard plane in the three-dimensional image is processing related to the recognition processing of a target object. In the case where the user observes a three-dimensional image, a two-dimensional cross-sectional image extracted from a three-dimensional image is normally observed. In the cross-sectional image, a cross section to be the reference of observation (standard plane) from an anatomical point-of-view exists. For example, the standard plane is a cross section extracted along an eye socket-external acoustic opening line connecting the center of the eye socket and the center of the external acoustic opening in a head CT image, or a cross section extracted along a Reid reference line connecting the lower edge of the eye socket and the upper edge of the external acoustic opening. The technique of the present disclosure is also effective on a standard plane of each captured image of various body parts or in different modalities.

A patch having a predetermined size is extracted from the processing image randomly, or in accordance with a predetermined pattern, and a binary determination of whether or not the extracted patch includes a standard plane (at a predetermined position and orientation) is executed using a recognizer. For example, it can be determined whether or not the patch includes the standard plane (at a predetermined position and orientation) by determining whether or not the structures or the like of a predetermined cross section in the patch and that of the observation cross section (standard plane) provided as a teacher image during learning match at a high degree. Here a patch, including the standard plane (at a predetermined position and orientation), is called a "positive patch", and a patch, not including the standard plane (at a predetermined position and orientation), is called a "negative patch". Each patch is inputted to the recognizer, and the likelihood that this patch is a positive patch is outputted, and it can be determined that this patch is a positive patch if the likelihood has a predetermined value or more. Then the position and orientation of each patch are stored, and the representative values (e.g. average values) of the position and orientation of the standard plane indicated by each positive patch are regarded as the position and orientation of this standard plane, whereby the standard plane can be identified (detected) in the three-dimensional image.

The processing steps S201 to S203 are the same as those of Embodiment 1, hence description thereof is omitted.

<Step S204: Acquiring Recognizer> In step S205, the recognizer acquiring unit 114 acquires a dictionary or a model, required for configuring the recognizer, from the storage unit 131. In Embodiment 4, however, the dictionary or model matching with the resolution of the patch image to be extracted in the next step S205 is acquired, which is different from Embodiment 1.

<Step S205: Executing Recognition Processing> In step S205, the patch extracting unit 612 extracts a plurality of patch images used for the recognition processing, from the processing image acquired in the processing step S203. The patch image extracted from the processing image, which is generated at the processing resolution of the recognition processing to be executed first, is an example of the one or more first patch images having the first resolution. The patch image extracted from the processing image, which is generated at the processing resolution of the recognition processing to be executed later, is an example of the one or more second patch images having a second resolution. Here the resolution of the patch image is assumed to be the same resolution (that is, the same pixel size) as the processing image. Further, the patch images have the same physical size regardless the resolution of the processing image. In the following, a case where the physical size of the patch image is 3.2 cm×3.2 cm×3.2 cm will be described as an example. If the pixel size of the processing image is 1 mm×1 mm×1 mm, for example, the recognition unit 115 extracts a patch image, of which pixel size is 1 mm×1 mm×1 mm and of which size is 32×32×32 pixels, from the processing image. In the same manner, if the pixel size of the processing image is 4 mm×4 mm×4 mm, the recognition unit 115 extracts a patch image, of which pixel size is 4 mm×4 mm×4 mm and of which size is 8×8×8 pixels, from the processing image (so that the physical size of the patch image becomes 3.2 cm×3.2 cm×3.2 cm).

The extraction range of the patch can be defined (specified) by the position and orientation of the patch coordinate system in the processing image coordinate system. The extraction range of the patch may be extracted at equal intervals from the origin of the processing image coordinate system, or may be generated randomly. Further, the extraction range of the patch may be determined based on the prior probability. In the case of being determined based on the prior probability, it is preferable to extract mainly an area where the standard plane is more likely to exist, such as an area near a certain axis in the three-dimensional image (e.g. peripheral area of x axis indicating the horizontal direction), whereby a number of times of searching can be reduced.

Further, in step S205, the recognition unit 115 executes the recognition processing for each of the extracted patches. In Embodiment 4, the recognition unit 115 calculates the likelihood (probability) that the standard plane is included (at a predetermined position and orientation) in each patch.

For example, a value outputted by the recognition unit 115 becomes closer to 1 for the likelihood, as the probably that the patch includes the standard plane (at the predetermined position and orientation) becomes higher, and a value outputted by the recognition unit 115 becomes closer to 0 for the likelihood, as the probability that the patch includes the standard plane (at the predetermined position and orientation) becomes lower. The recognition unit 115 identifies a patch, of which likelihood exceeds 0.5, as a positive patch, and a patch, of which likelihood is less than 0.5, as the negative patch.

In step S205, for each patch recognized as a positive patch, the recognition unit 115 calculates the position and orientation of the standard plane, which is the estimation result, based on the parameters used for extracting the patches (position and orientation in the patch coordinate system in the processing image coordinate system). Specifically, for example, based on the position and orientation of each positive patch in the three-dimensional image, the position and orientation of the standard plane, which is included in this positive patch at a predetermined position and orientation, are calculated in the three-dimensional image. In the following, these values are called the position and orientation of the standard plane indicated by each positive patch. Then the representative values (e.g. average values) of the position and orientation of the standard plane indicated by each positive patch are regarded as the position and orientation of the standard plane. The method for determining the standard plane from the positive patches is not limited thereto, and a weighted average of the position and orientation of the standard plane indicated by each positive patch, where likelihood of each patch is used as a weight, may be used, for example.

<Step S206: Executing Determination Processing> In the image processing apparatus 601, the determination unit 116 determines whether or not the result of the recognition processing performed by the recognition unit 115 is appropriate, based on the re cognition result. For example, the recognition result is determined as appropriate when a predetermined condition is satisfied, when the predetermined condition is, for example, that a number of positive patches in the recognition result is a predetermined threshold or more. In other words, a number of positive patches in a recognition result is defined as a reliability of this recognition result, and the recognition result is determined as appropriate when the reliability is a predetermined threshold or more. In order to reduce the influence of noise and detection error, it is preferable that 3 or more positive patches are detected, for example.

If the number of positive patches is less than the predetermined threshold, on the other hand, the recognition unit 115 determines that the outputted recognition processing result is likely to be inappropriate.

The processing steps from S207 to S210 are the same as those of Embodiment 1, hence description thereof is omitted.

Modification 4-1: Sliding Window Method

In the example described in Embodiment 4, tin the image processing apparatus 601, the patches are randomly extracted from the processing image in accordance with a predetermined pattern. The technique of the present disclosure, however, may also be used in the case of a sliding window method, where a search window is set and the search window is moved within an image. In this case, the image processing apparatus 601 includes a search window setting unit and a search window moving unit which are implemented by the processing of the control unit 611. After the processing image is acquired in the processing in step S203, the search window, of which size and position of the window are set by the search window setting unit, is moved by the search window moving unit, and a binary determination is performed on the image in the search window by the recognizer. The moving distance of the search window may be predetermined or random, but in a case where a prior probability that the detection target exists is available, the search accuracy can be improved if the search window is moved in short intervals in an area where the existing probability is high. Just like the patch extraction method, the position of the detection target can be specified by using the coordinate values of the search window when determined as positive.

Modification 4-2: Method for Extracting Patch Image Directly from Input Image In the example described in Embodiment 4, the patch images are extracted in the image processing apparatus 601, after performing the processing to reduce resolution of the input image. The technique of the present disclosure, however, may also be used not only in the case of performing the processing to reduce resolution of the input image itself, but also in the case of changing the resolution of the patch images extracted from the input image. In the latter case, in step S202, the control content determining unit 117 determines the resolution of the patch images first. In step S203, the resolution changing unit 113 need not always execute the resolution change processing on the input image. In step S204, the recognizer acquiring unit 114 acquires a dictionary or a model matching with the determined resolution of the patch images. In step S205, in accordance with the determined resolution, the recognition unit 115 extracts the patch images from the input image (while reducing the resolution to the specified resolution), and executes the recognition processing.

Embodiment 5

In the example described in Embodiment 1, one input image is acquired in the image processing apparatus 101, and a low resolution image is generated from this input image and used as a processing image, but the technique of the present disclosure may also be used for the case of acquiring a plurality of input images having different resolutions. In this case, the resolution changing unit in the image processing apparatus 101 may be omitted.

Some imaging apparatuses output two types of images: a preview image which is a captured image, easily acquired at low resolution; and a final output image acquired after executing all the predetermined processing steps at an original resolution. For this type of apparatus as well, the recognition accuracy can be improved by executing the recognition processing first in the preview image, and then executing the recognition processing using the final output image only when the first recognition result was determined as inappropriate.

Now Embodiment 5 will be described. An image processing apparatus according to Embodiment 5 acquires a plurality of input images having different resolutions (low resolution image and high resolution image), and executes the recognition processing first for the low resolution image. Then after determining whether or not the recognition result is appropriate, the image processing apparatus executes the recognition processing again for the high resolution image if the recognition result is inappropriate.

In Embodiment 5, the image resolution changing unit of the image processing apparatus 701 is different from that described in the image processing apparatus 101 in Embodiments 1 to 3. Another difference from the above described embodiments is the image acquiring method in step S208 executed by this image processing apparatus. In the following, the aspects that are different from Embodiments 1 to 4 will be mainly described, and a composing element or processing step the same as Embodiments 1 to 4 is denoted with a same reference sign, and detailed description thereof will be omitted.

Figure 8:
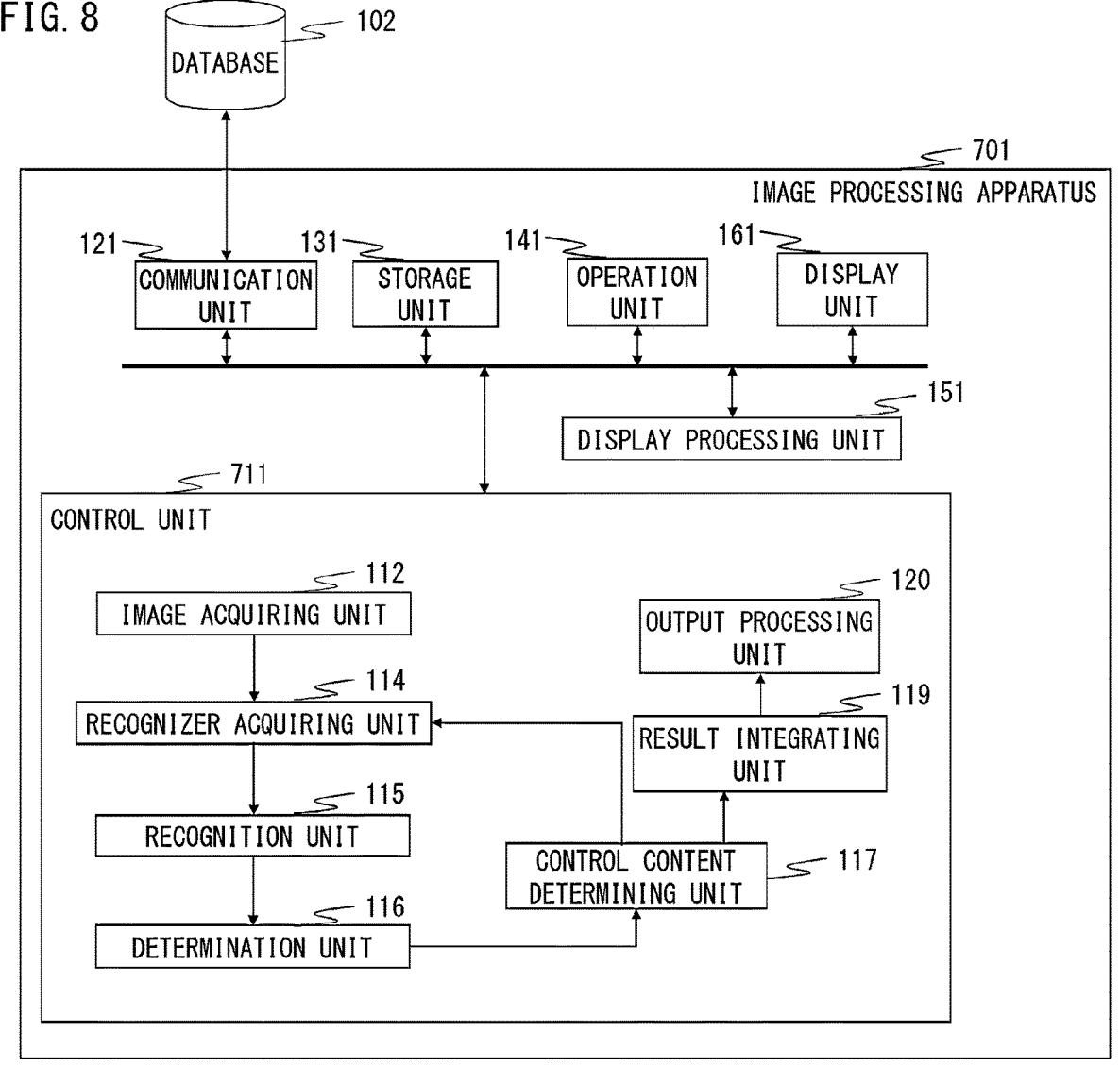
FIG. 8 is a block diagram of an apparatus according to Embodiment 5.

FIG. 8 is a block diagram depicting a general configuration example of the image processing apparatus 701 according to Embodiment 5. As indicated in FIG. 8, in a control unit 711 of the image processing apparatus 701, the resolution changing unit 113 is omitted in the configuration of the control unit 111 of the image processing apparatus 101.

<Step S201: Acquiring Image> In step S201, the image acquiring unit 112 acquires from the storage unit 131 an input image, constituted of a plurality of images having different resolutions (e.g. a preview image which is a low resolution image, and a final output image which is a high resolution image), which the user specified using the operation unit 141. The combination of the preview image and the final output image is merely an example of the plurality of images having different resolutions, and a combination of different images may be used. For example, a plurality of CT images generated by reconstructing the same image data using different reconfiguration parameters (e.g. slice thickness: 1 mm and slice thickness: 5 mm) may be used.

<Step S202: Instructing Control Content> In step S202, the control content determining unit 117 determines the next processing resolution by selecting one of the input images as the processing image to be used next. At this time, the control content determining unit 117 sets the processing image so that the processing resolution becomes higher in the recognition processing that is performed later than the recognition processing that is performed first in the plurality of times of the image processing. In Embodiment 5, the resolution of the preview image is set for the low resolution image when this step is executed for the first time, and the resolution of the final output image of the imaging apparatus is set for the high resolution image when this step is executed for the second time.

Embodiment 6

In the example described in Embodiment 1, the recognition processing is performed in the image processing apparatus 101, first for a low resolution image, and then for an image having a different resolution if it is determined the resolution result is inappropriate. However, the image processing apparatus 101 may have a configuration to perform the recognition processing on a plurality of images having different resolutions simultaneously. In the following, the aspects that are different from Embodiments 1 to 5 will be mainly described, and a composing element or processing step the same as Embodiments 1 to 5 is denoted with a same reference sign, and detailed description thereof will be omitted.

The processing flow chart of the image processing apparatus according to Embodiment 6 is approximately the same as that of Embodiment 1. In step S203, however, the resolution changing unit 113 generates low resolution images having a plurality of resolutions, for which the recognition processing is executed, from the input image, and uses these low resolution images as the plurality of processing images. Further, in step S204, the recognizer acquiring unit 114 acquires recognizers that are required for the recognition processing for the processing images respectively. Further, in step S205, the recognition unit 115 executes the recognition processing for all the processing images in parallel. Furthermore, in step S205, before all the processing in step S203 is terminated, the determination unit 116 determines the reliability of the recognition result of each processing image as soon as the recognition processing for each processing image is terminated. When at least one processing image of which the determination result is appropriate is acquired, the processing in step S205, for all the other processing images, is interrupted, and processing advances to step S209.

In the case of performing the recognition processing for a plurality of images having different resolutions simultaneously, the execution time required for the recognition processing changes depending on the resolution. Normally the processing for a high resolution image takes longer than the processing for a low resolution image. Therefore in the case of performing the recognition processing for images having different resolutions, the recognition processing and the determination processing for the low resolution image are terminated, hence only the determination result of the low resolution image may be used. In the case where the result of the recognition processing for the low resolution image is determined appropriate here, the processing for the high resolution image is interrupted, even if the recognition processing or the determination processing for the high resolution image is advancing, and the recognition processing for the result of the low resolution image is outputted. Only in the case where it is determined that the result of the recognition processing for the low resolution image is inappropriate, result of recognition processing for the high resolution image is acquired, and this recognition processing result is outputted. Thereby processing speed can be increased while maintaining the recognition accuracy (both high accuracy and high-speed are implemented).

Embodiment 7

In Embodiments 1 to 6, the reliability when the final target of the recognition processing (e.g. standard plane of a three-dimensional image in the case of Embodiment 4) is determined at each resolution, but the target of evaluating the reliability may be an intermediate target of the recognition processing. In the following, the aspects that are different from Embodiments 1 to 6 will be mainly described, and a composing element or processing step the same as Embodiments 1 to 6 is denoted with a same reference sign, and detailed description thereof will be omitted.

An image processing apparatus according to Embodiment 7 is an image processing apparatus that recognizes an observation cross section (standard plane) from a three-dimensional medical image, just like Embodiment 4, and further recognizes (estimates positions of) anatomical landmarks existing on the acquired observation cross section, and outputs both recognition results. In other words, the final target of the recognition processing in the image processing apparatus of Embodiment 7 are the positions of the anatomical landmarks on the standard plane, and the standard plane is regarded as an intermediate target.

Here the image processing apparatus executes the recognition processing on the observation cross section for the low resolution image first, just like Embodiment 4. Then it is determined whether or not the recognition result of the observation cross section is appropriate, and if appropriate, the image processing apparatus further performs the recognition processing for the anatomical landmarks in the image of the observation cross section that is set at the same resolution. If the recognition result of the observation cross section is inappropriate, on the other hand, the image processing apparatus does not execute the recognition processing for the anatomical landmarks (at this resolution), changes the processing resolution (to a higher resolution), and executes the recognition processing for the observation cross section again. Then the recognition processing for the anatomical landmarks is executed for the standard plane of which recognition result is determined appropriate.

The processing flow chart of the image processing apparatus according to Embodiment 7 is approximately the same as that of Embodiment 4. In other words, after executing the processing steps S201 to S209 in Embodiment 4, the recognition unit 115 executes the recognition (position estimation) processing for the anatomical landmarks on the image of the estimated standard plane. The resolution of the image of the standard plane used for recognition the anatomical landmarks may be the same as the resolution of the processing image of which result was determined appropriate in step S207, or may be a fixed resolution (e.g. resolution of input image). Then in step S210, the output processing unit 120 outputs the recognition result, that is, parameters of the standard plane and coordinates of the anatomical landmarks.

Embodiment 8

In Embodiments 1 to 7, when a plurality of low resolution images are generated using the processing resolution that was set in step S202, the control unit 111 acquires the recognition result of each processing image by repeatedly executing the recognition processing and determination processing for each image. The control unit 111, however, may execute the recognition processing and determination processing in parallel for low resolution images having different resolutions. In this case, the control unit 111 terminates the processing steps being executed in parallel at the point when it is determined that the recognition result of any one of the low resolution images is appropriate, and outputs the recognition result. In the following, the aspects that are different from Embodiments 1 to 7 will be mainly described, and a composing element or processing step the same as Embodiments 1 to 7 is denoted with a same reference sign, and detailed description thereof will be omitted.

Figure 9:
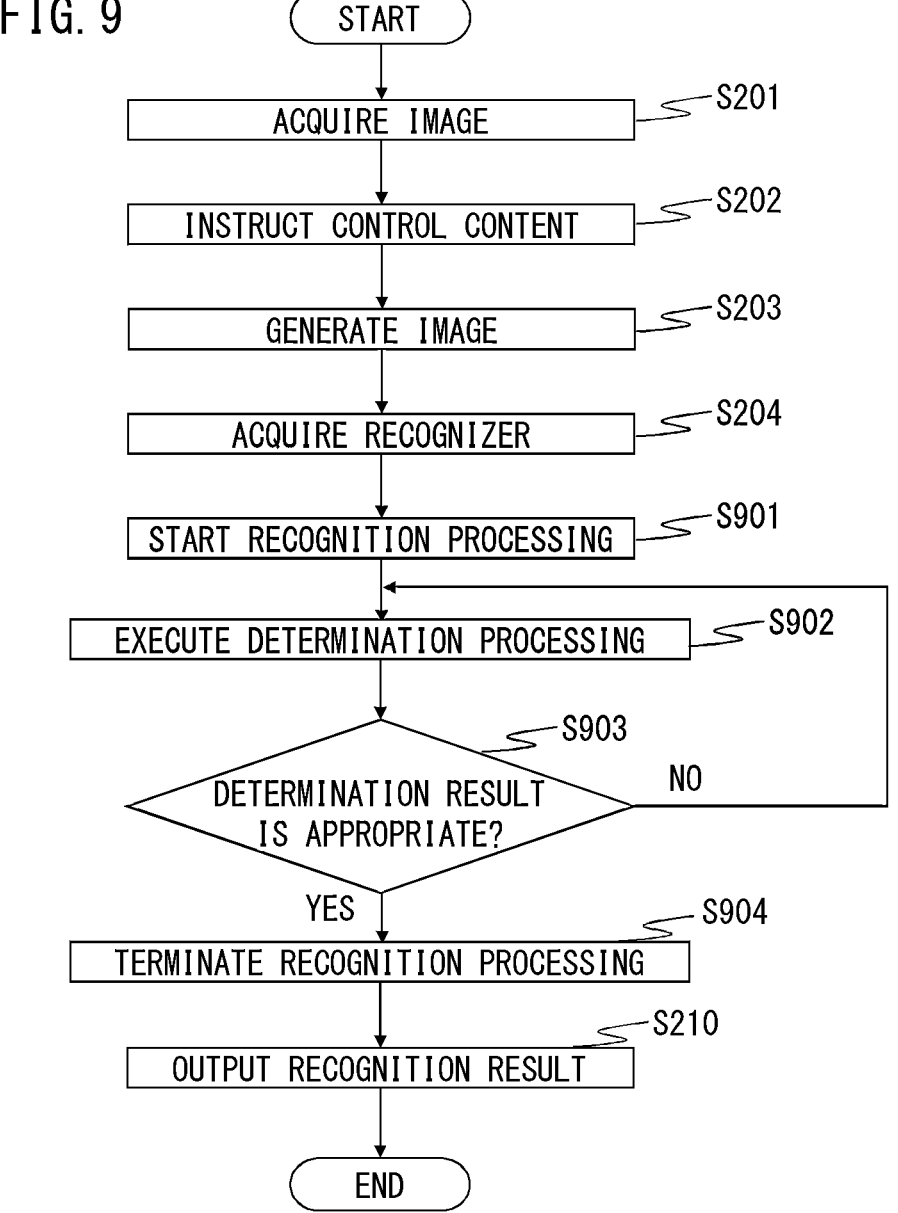
FIG. 9 is a flow chart of processing executed by an image processing apparatus according to Embodiment 8.

FIG. 9 is a flow chart of the processing steps executed by the control unit 111 according to Embodiment 8. In Embodiment 8, the resolution changing unit 113 generates a low resolution image having a processing resolution, which was set in step S202, and outputs the low resolution image to the recognition unit 115 in step S203. In step S901, the recognition unit 115 starts the recognition processing for each low resolution image generated by the resolution changing unit 113.

Then in step S902, based on the recognition result by the recognition unit 115, the determination unit 116 determines whether or not the recognition result is appropriate. Then in step S903, the control content determining unit 117 advances the processing to step S904 if the determination unit 116 determined that the recognition result is appropriate in step S902 (S903: YES). If the determination unit 116 determined that the recognition result is "inappropriate" in step S902 (S903: NO), on the other hand, the control content determining unit 117 returns the processing to S902, and executes the determination processing for the processing images for which the determination processing has not yet been executed.

Then in step S904, the recognition unit 115 terminates the recognition processing for each low resolution image which was started in step S902, and advances the processing to step S210. In step S210, the output processing unit 120 outputs the recognition result which was determined appropriate in step S903. Thereby the recognition processing is executed in parallel for each low resolution image generated at two different processing resolutions in parallel, and at a point when the recognition result acquired from the processing image having a lower resolution is determined appropriate, the recognition processing for the processing image having a higher resolution is terminated. Therefore according to the image processing apparatus of Embodiment 8, processing load can be reduced while maintaining the recognition accuracy in the image recognition processing (both high accuracy and high processing speed are implemented).

Whereas embodiments of the present invention have been described, the technique of the present disclosure is not limited thereto, and can be changed or modified within the scope of the spirit of the technique of the present disclosure. Furthermore, each embodiment and each modification described above may be combined as required.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The technique of the present disclosure can be carried out as a mode of the system, an apparatus, a method, a program, a recording medium (storage medium) or the like, for example. Specifically, the technique of the present disclosure may be applied to a system constituted of a plurality of devices (e.g. host computer, interface device, imaging apparatus, web application, and the like), or may be applied to an apparatus constituted of one device.

Needless to say, the object of the technique of the present disclosure is implemented by the following. That is, recording medium (or storage medium), in which program codes (computer program) of software to implement the above mentioned functions of the embodiments are recorded, is supplied to a system or an apparatus. This storage medium is a computer-readable storage medium. Then the computer (CPU or MPU) of the system or the apparatus reads and executes the program codes stored in the recording medium. In this case, the program codes read from the recording medium directly implement the above mentioned functions of the embodiments, and the recording medium recording these program codes constitute the present invention.

According to the present disclosure, an image processing apparatus that can implement both high recognition accuracy and fast processing speed in the image recognition processing can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-014199, filed on Feb. 1, 2022, which is hereby incorporated by reference herein in its entirety.

What is claimed is:

1. An image processing apparatus configured to perform recognition processing for a target object in an input image, comprising:

at least one memory storing a program; and at least one processor which, by executing the program, causes the image processing apparatus to:

perform the recognition processing for the target object in a first image having a first resolution acquired based on the input image and acquire a first recognition result;

determine whether or not a reliability of the first recognition result satisfies a predetermined standard; and perform the recognition processing for the target object in a second image which has a higher resolution than the first resolution acquired based on the input image, and acquire a second recognition result, in a case where it is determined that the reliability of the first recognition result does not satisfy the predetermined standard, wherein the first recognition result and the second recognition result indicate likelihood to which the target object belongs to a predetermined classification type, and the at least one processor causes the image processing apparatus to determine that the reliability of the first recognition result satisfies the predetermined standard in a case where the likelihood indicated by the first recognition result is a predetermined likelihood or more, or in a case where the likelihood difference between the classification types using the likelihood indicated by the first recognition result is a predetermined likelihood difference or more.

2. The image processing apparatus according to claim 1, wherein the at least one processor causes the image processing apparatus to acquire a third recognition result based on at least one of the first recognition result and the second recognition result, depending on the reliability of the first recognition result and/or the reliability of the second recognition result.

3. The image processing apparatus according to claim 1, wherein the at least one processor causes the image processing apparatus to acquire a third recognition result by integrating the first recognition result and the second recognition result, based on the reliability of the first recognition result and the reliability of the second recognition result.

4. The image processing apparatus according to claim 1, wherein the at least one processor further causes the image processing apparatus to output the first recognition result in a case where it is determined that the reliability of the first recognition result satisfies a predetermined standard.

5. The image processing apparatus according to claim 1, wherein the at least one processor causes the image processing apparatus to output one of the first recognition result and the second recognition result having a higher reliability, as the recognition result, in a case where it is determined that the reliability of the first recognition result does not satisfy the predetermined standard.

6. The image processing apparatus according to claim 1, wherein the at least one processor causes the image processing apparatus to integrate the first recognition result and the second recognition result, in a case where it is determined that the reliability of the first recognition result does not satisfy the predetermined standard.

7. The image processing apparatus according to claim 1, wherein the at least one processor causes the image processing apparatus to perform recognition processing for the target object in the second image and acquire the second recognition result, in a case where it is determined that the reliability of the first recognition result satisfies the predetermined standard.

8. An image processing apparatus configured to perform recognition processing for a target object in an input image, comprising:

at least one memory storing a program; and at least one processor which, by executing the program, causes the image processing apparatus to:

perform the recognition processing for the target object in a first image having a first resolution acquired based on the input image and acquire a first recognition result;

determine whether or not a reliability of the first recognition result satisfies a predetermined standard;

perform the recognition processing for the target object in a second image which has a higher resolution than the first resolution acquired based on the input image, and acquire a second recognition result, in a case where it is determined that the reliability of the first recognition result does not satisfy the predetermined standard; and determine a coefficient to reduce a resolution of the input image, wherein the first image is an image having a resolution that is acquired by using a first coefficient determined by the image processing apparatus, and the second image is an image having a resolution that is acquired by using a second coefficient that generates a higher resolution than the first coefficient determined by the image processing apparatus.

9. An image processing apparatus configured to perform recognition processing for a target object in an input image, comprising:

at least one memory storing a program; and at least one processor which, by executing the program, causes the image processing apparatus to:

perform the recognition processing for the target object in a first image having a first resolution acquired based on the input image and acquire a first recognition result;

determine whether or not a reliability of the first recognition result satisfies a predetermined standard; and perform the recognition processing for the target object in a second image which has a higher resolution than the first resolution acquired based on the input image, and acquire a second recognition result, in a case where it is determined that the reliability of the first recognition result does not satisfy the predetermined standard, wherein the first recognition result and the second recognition result are recognition results of recognition processing using coordinate values of a landmark that indicates a position of a feature of the target object in the input image, and the at least one processor causes the image processing apparatus to determine that the reliability of the first recognition result satisfies the predetermined standard in a case where the landmark exists at a predetermined position based on brightness of the input image in the first recognition result.

10. The image processing apparatus according to claim 9, wherein the at least one processor causes the image processing apparatus to acquire a third recognition result based on at least one of the first recognition result and the second recognition result, depending on the reliability of the first recognition result and/or the reliability of the second recognition result.

11. The image processing apparatus according to claim 9, wherein the at least one processor causes the image processing apparatus to acquire a third recognition result by integrating the first recognition result and the second recognition result, based on the reliability of the first recognition result and the reliability of the second recognition result.

12. The image processing apparatus according to claim 9, wherein the at least one processor further causes the image processing apparatus to output the first recognition result in a case where it is determined that the reliability of the first recognition result satisfies a predetermined standard.

13. The image processing apparatus according to claim 9, wherein the at least one processor causes the image processing apparatus to output one of the first recognition result and the second recognition result having a higher reliability, as the recognition result, in a case where it is determined that the reliability of the first recognition result does not satisfy the predetermined standard.

14. The image processing apparatus according to claim 9, wherein the at least one processor causes the image processing apparatus to integrate the first recognition result and the second recognition result, in a case where it is determined that the reliability of the first recognition result does not satisfy the predetermined standard.

15. The image processing apparatus according to claim 9, wherein the at least one processor causes the image processing apparatus to perform recognition processing for the target object in the second image and acquire the second recognition result, in a case where it is determined that the reliability of the first recognition result satisfies the predetermined standard.

16. An image processing apparatus configured to perform recognition processing for a target object in an input image, comprising:

at least one memory storing a program; and at least one processor which, by executing the program, causes the image processing apparatus to:

perform the recognition processing for the target object in a first image having a first resolution acquired based on the input image and acquire a first recognition result;

determine whether or not a reliability of the first recognition result satisfies a predetermined standard; and perform the recognition processing for the target object in a second image which has a higher resolution than the first resolution acquired based on the input image, and acquire a second recognition result, in a case where it is determined that the reliability of the first recognition result does not satisfy the predetermined standard, wherein the first image is at least one first patch image having the first resolution, which is part extracted from the input image, the second image is at least one second patch image having a second resolution higher than the first resolution, which is a part extracted from the input image, and each of the first recognition result and the second recognition result indicates a likelihood that a target cross section is included in the first patch image or the second patch image respectively.

17. The image processing apparatus according to claim 16, wherein the at least one processor causes the image processing apparatus to determine that the reliability of the first recognition result satisfies the predetermined standard in a case where a number of first patch images, of which likelihood indicated in the first recognition result is a predetermined likelihood or more, satisfies a predetermined condition.

18. An image processing method comprising steps of:

performing recognition processing for a target object in an input image;

performing the recognition processing for the target object in a first image having a first resolution acquired based on the input image, and acquiring a first recognition result;

determining whether or not a reliability of the first recognition result satisfies a predetermined standard; and performing the recognition processing for the target object in a second image which has a higher resolution than the first resolution acquired based on the input image and acquiring a second recognition result, in a case where it is determined that the reliability of the first recognition result does not satisfy the predetermined standard, wherein the first recognition result and the second recognition result indicate likelihood to which the target object belongs to a predetermined classification type, and the determining determines that the reliability of the first recognition result satisfies the predetermined standard in a case where the likelihood indicated by the first recognition result is a predetermined likelihood or more, or in a case where the likelihood difference between the classification types using the likelihood indicated by the first recognition result is a predetermined likelihood difference or more.

19. A non-transitory computer readable medium that stores a program, wherein the program causes a computer to execute steps of:

performing recognition processing for a target object in an input image;

performing the recognition processing for the target object in a first image having a first resolution acquired based on the input image, and acquiring a first recognition result;

determining whether or not a reliability of the first recognition result satisfies a predetermined standard; and performing the recognition processing for the target object in a second image which has a higher resolution than the first resolution acquired based on the input image and acquiring a second recognition result, in a case where it is determined that the reliability of the first recognition result does not satisfy the predetermined standard, wherein the first recognition result and the second recognition result indicate likelihood to which the target object belongs to a predetermined classification type, and the determining determines that the reliability of the first recognition result satisfies the predetermined standard in a case where the likelihood indicated by the first recognition result is a predetermined likelihood or more, or in a case where the likelihood difference between the classification types using the likelihood indicated by the first recognition result is a predetermined likelihood difference or more.

\*    \*    \*    \*    \*